(12) United States Patent
Kotzin

(10) Patent No.: US 7,822,544 B2
(45) Date of Patent: Oct. 26, 2010

(54) METHOD AND SYSTEM OF PROVIDING NAVIGATION INFORMATION

(75) Inventor: Michael D. Kotzin, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1105 days.

(21) Appl. No.: 11/243,618

(22) Filed: Oct. 5, 2005

(65) Prior Publication Data

US 2007/0078597 A1    Apr. 5, 2007

(51) Int. Cl.
*G01C 21/00* (2006.01)
(52) U.S. Cl. .................... 701/209; 701/207
(58) Field of Classification Search ......... 701/207–213; 340/905, 992, 994, 995.17–995.24
See application file for complete search history.

(56) References Cited

U.S. PATENT DOCUMENTS

| 6,400,690 | B1 | | 6/2002 | Liu et al. |
| 6,401,034 | B1 | * | 6/2002 | Kaplan et al. ............... 701/209 |
| 6,490,690 | B1 | | 12/2002 | Gusler et al. |
| 6,614,363 | B1 | * | 9/2003 | Behr et al. ............ 340/995.19 |
| 6,989,765 | B2 | * | 1/2006 | Gueziec ..................... 340/905 |
| 7,099,772 | B2 | * | 8/2006 | Hayot et al. ................ 701/202 |
| 7,133,733 | B2 | | 11/2006 | Hamaguchi et al. |

OTHER PUBLICATIONS

PCT Notification of Transmittal of the International Search Report and the Written Opinion of the International Searching Authority, or the Declaration, Mailed Jan. 11, 2007, pp. 1-9, PCT No. PCT/US06/34933, US Commissioner of Patents, Alexandria, Virginia, USA.
US Department of Transportation, Federal Highway Administration, "Intelligent Transportation Systems" Real World Benefits, Jan. 1998, vol. FHWA-JPO-98-018, pp. 1-44, Washington, DC, USA.

* cited by examiner

*Primary Examiner*—Richard M. Camby

(57) ABSTRACT

A method and system of providing navigation information is provided. The method comprises obtaining (105) a communication requirement of a user and determining (110) at least one navigation route for the user based on the communication requirement dependent upon network considerations along the route. The method further comprises providing (115) the at least one navigation route to the user based on the communication requirement.

3 Claims, 5 Drawing Sheets

METHOD AND SYSTEM OF PROVIDING NAVIGATION INFORMATION

FIELD OF THE INVENTION

The present invention relates to a system and method of providing navigation information. More specifically, the present invention pertains to providing a user with a navigation route based on certain communication criteria.

BACKGROUND OF THE INVENTION

In present navigation systems, navigation instructions are provided to a subscriber using on-board navigation systems. There are navigation systems that have the ability to select a route based on criteria such as shortest distance or shortest travel time, avoidance of traffic jams, toll routes or accidents, scenic beauty, and the like. It has been observed that the transfer of information in these navigation systems from a radio network to the subscriber over the air can be expensive. Furthermore, subscribers can be in bad locations, which suffer from poor communication infrastructure or capability.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
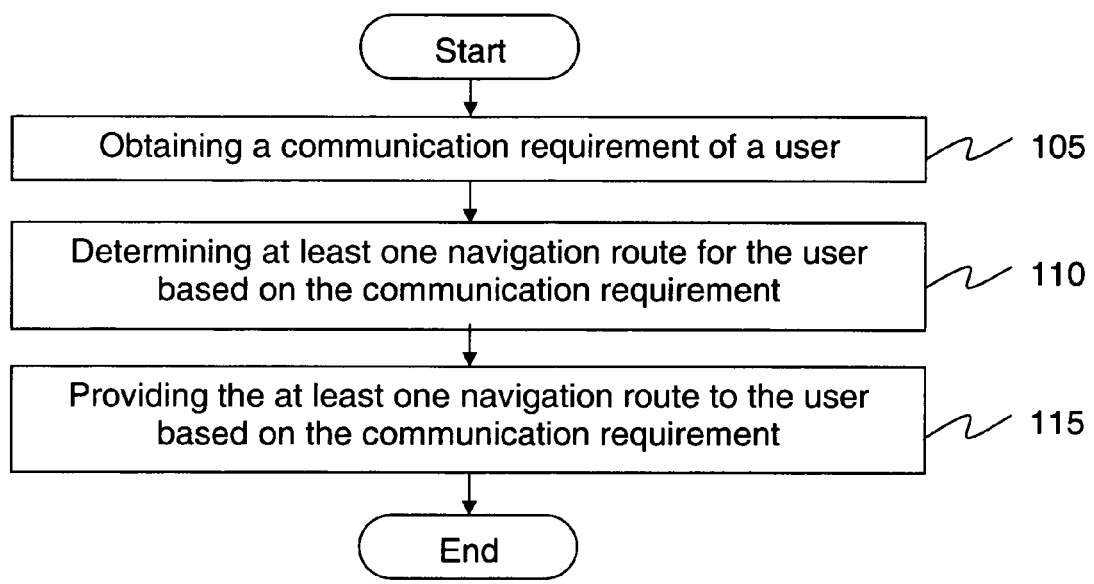
FIG. 1 illustrates a flow diagram depicting a method for providing navigation information in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to providing a user with a navigation route based on certain communication criteria. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a navigation system described herein. The non-processor circuits may include, but are not limited to, a radio receiver, a radio transmitter, signal drivers, clock circuits, power source circuits, and user input devices. As such, these functions may be interpreted as steps of a method to perform providing a user with a navigation route based on certain communication criteria. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention pertains to a system and method for providing navigation information based on a communication requirement. The method comprises obtaining a communication requirement of a user. The method further comprises determining at least one navigation route for the user based on the communication requirement and providing the at least one navigation route based on the communication requirement.

According to an embodiment, FIG. 1 illustrates a flow diagram depicting a method for providing navigation information. At step 105, a communication requirement is obtained from a user. The user can provide one or more communication criteria or requirements such as, a content download requirement or a reception of broadcast requirement. Once the communication requirement has been received, at least one navigation route is determined based on the communication requirement dependent upon network considerations along the route, as per step 110. Having determined the navigation route, at step 115 the at least one navigation route is provided to the user based on the communication requirement, preferably continuously.

Figure 2:
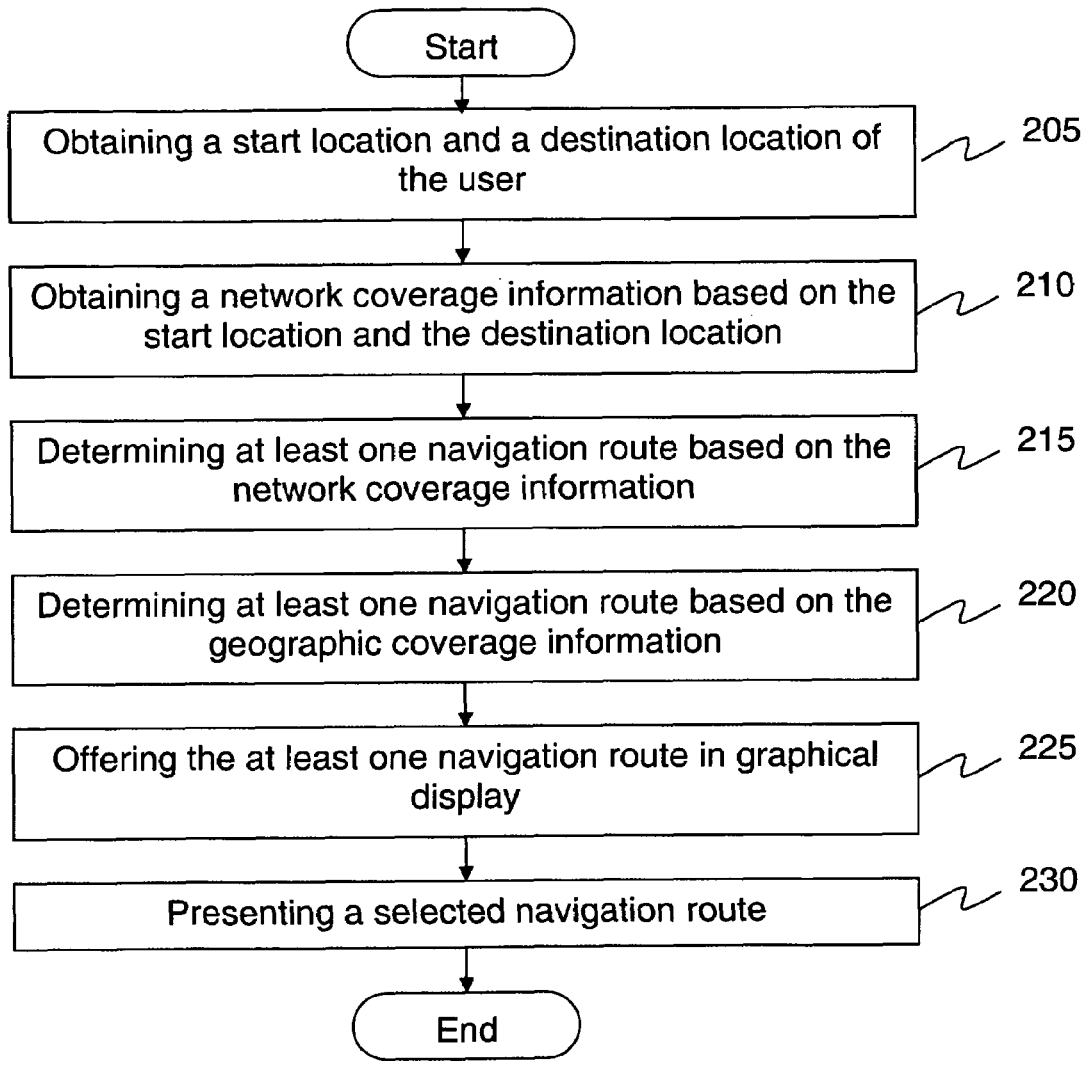
FIG. 2 illustrates a flow diagram depicting a method for providing navigation information in accordance with another embodiment of the present invention.

Referring now to FIGS. 1 and 2, wherein FIG. 2 further elaborates the step 110 of determining the at least one navigation route. The step 110 of determining the at least one navigation route based on the communication requirement further comprises obtaining a start location and a destination location of the user as per step 205. The start location and the destination location can be physical locations between which the user may want to be navigated by a navigation system. The determining step 110 further comprises as per step 210, obtaining a network coverage information based on the start location and the destination location. Having obtained the network coverage information, at step 215 the at least one navigation route is determined based on the network coverage information. For example, the user can be provided one or more navigation routes based on a choice of different telecommunication networks, network coverage, or network availability. The determining step 110 further comprises at step 220 determining the at least one navigation route based on a geographic coverage information. For example, one or more navigation routes are provided to the user based on availability and quality of certain telecommunication networks in the geographic area covering the journey from the start location to the destination location. In an embodiment of the present invention, the geographic coverage information can be retrieved from a database of geographic coverage locations with certain performance criteria, for example, an excellent coverage performance, a good coverage performance, a fair coverage performance, and a poor coverage performance for different kinds of communication services that might be offered or for the different communication requirements. Having determined the at least one navigation route based on the communication requirement of the user, the at least one navigation route can be offered to the user in a graphical display, as per step 225. Once user selects a route from one or more of the navigation routes provided, the selected navigation route is presented to the user as per step 230. As mentioned earlier the presented navigation route can be continuously provided to the user till the user reaches the destination location or the desired location.

In various embodiments of the present invention, the determining step 110 can comprise selecting an operator from a plurality of available network operators.

Figure 3:
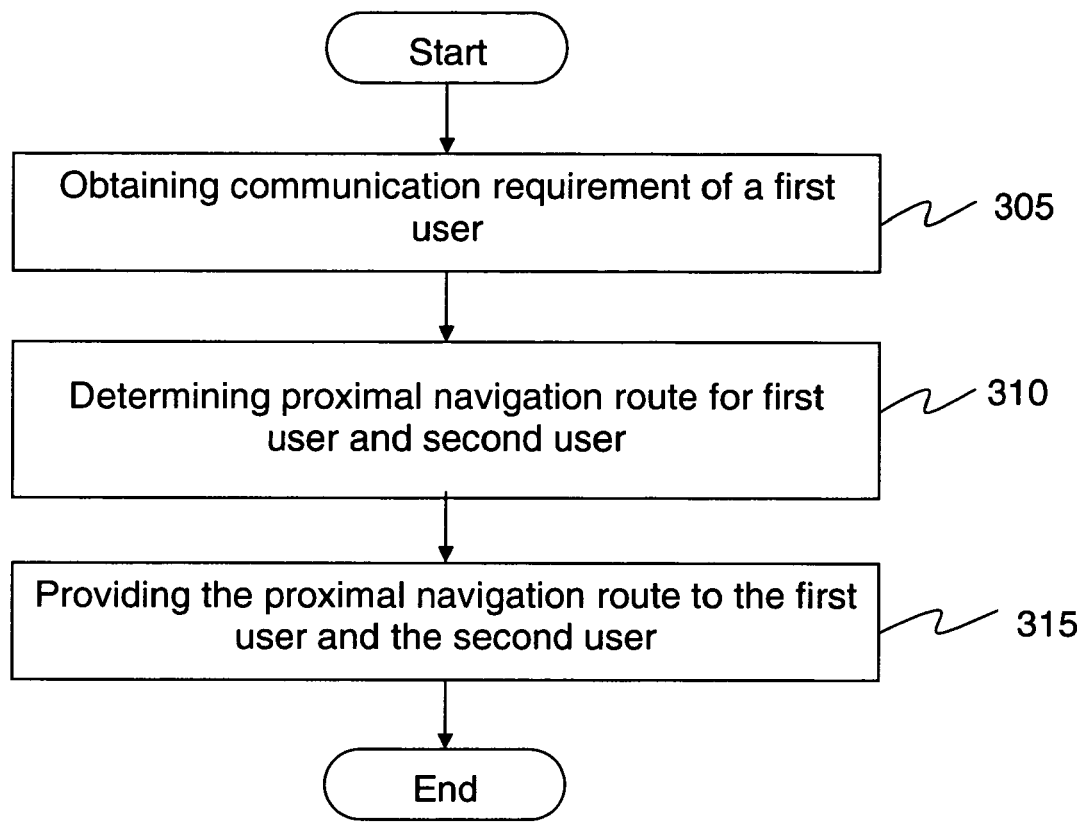
FIG. 3 illustrates a flow diagram depicting a method for providing navigation information in accordance with another embodiment of the present invention.
Figure 4:
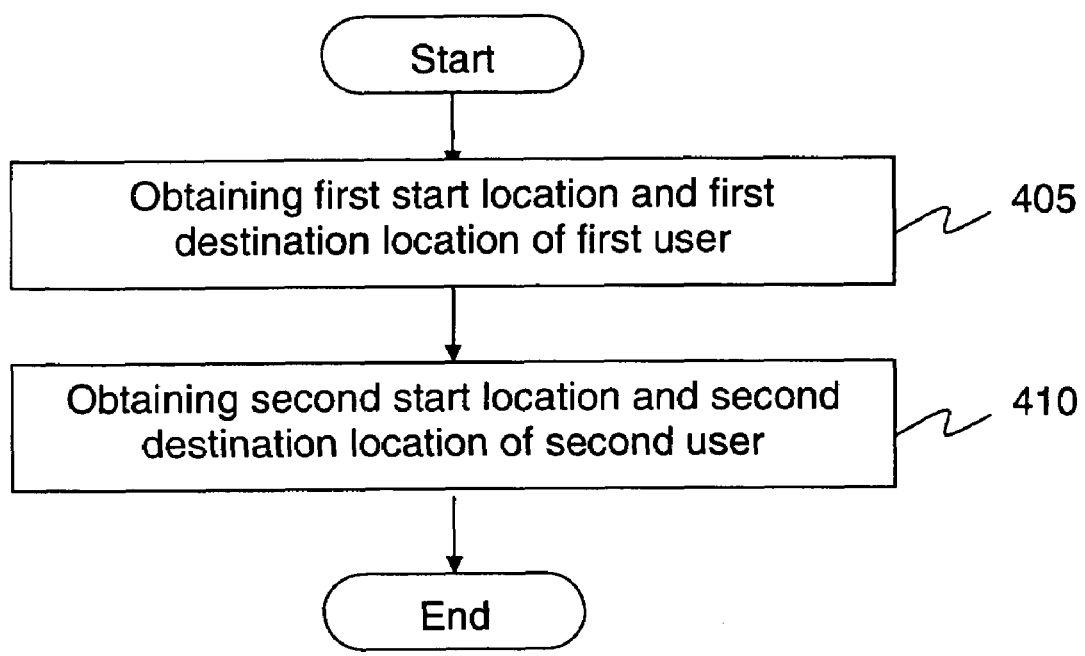
FIG. 4 illustrates a flow diagram depicting a method for providing navigation information in accordance with another embodiment of the present invention.

Pursuant to another embodiment of the present invention, navigation information can be provided by a peer-to-peer method wherein a first user obtains desired communication or content residing with or dependent on a second user. According to the embodiment shown in to FIG. 3, a flow diagram depicts a method for providing navigation information in a peer-to-peer communication system. As per step 305, a communication requirement is obtained from a first user. For example, the first user may want to download a certain file residing with the second user. In another example, the first user and second user may want to share or exchange data. Having received the communication requirement from the first user as per step 305, a proximal navigation route is determined for the first user and the second user as per step 310. At step 315 the proximal navigation route can be provided to the first user and the second user. Alternatively, the proximal navigation route may be continuously provided to the first user and the second user.

The step of determining the proximal navigation route at 310 further comprises obtaining a first start location and a first destination location of the first user at step 405. At step 410 the determining step 310 further comprises obtaining a second start location and a second destination location of the second user. In an embodiment of the present invention it is possible that the first user and the second user may have the same or different start location and destination location or end location.

Figure 5:
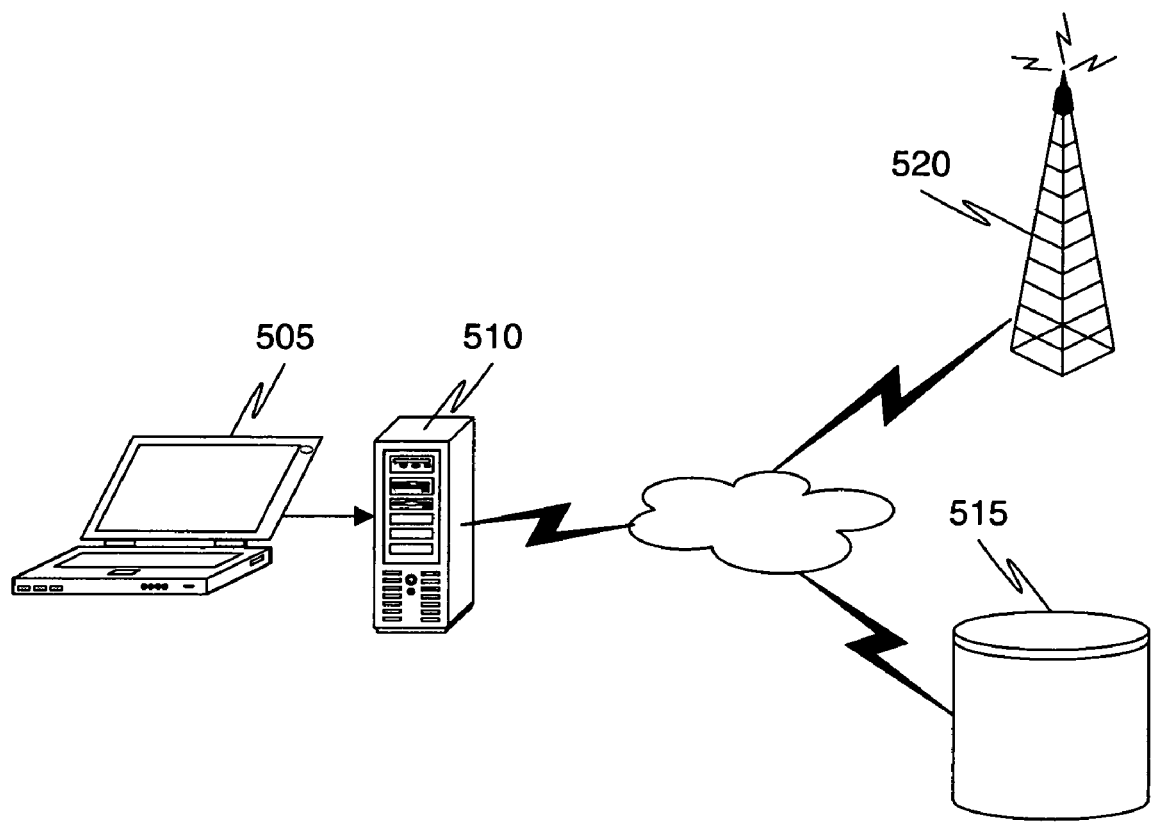
FIG. 5 illustrates a block diagram of a navigation system in accordance with embodiments of the present invention.

According to another embodiment, FIG. 5 illustrates an exemplary configuration of a system 500 for providing navigation information. A communication device 505 is enabled to send a communication requirement. The communication device 505 may be a mobile communication device such as a laptop, a mobile phone, a personal digital assistant, etc. The communication device 505 can be in communication with a base radio subsystem 520. The base radio subsystem 520 may be enabled to receive the communication requirement and configured to forward the communication requirement to a server 510. The server 510 may be enabled to receive the communication requirement and provide at least one navigation route to the communication device 505 based on the communication requirement dependent upon network considerations along the route. The server 510 may operate in conjunction with a geographical communications database 515 that participates in determining the at least one navigation route provided to a user. The geographical communications database 515, for example, may be enabled to provide network coverage performance criteria for a plurality of communication services. The plurality of communication services may be at least one of mobile phone services and internet provider services. The performance criteria, for example, can be an excellent coverage performance, a good coverage performance, a fair coverage performance, and a poor coverage performance for the plurality of communication services that might be offered or for the various communication requirements. The base radio subsystem 520, the server 510 and the geographical communications database 515 are connected to an internet network.

The various embodiments of the present invention provide a method and system for providing navigation information which otherwise is not available for providing a user with a navigation route based on certain communication criteria.

Further, the various embodiments of the present invention provide a peer-to-peer method wherein a first user obtains desired communication or content residing with or dependent on a second user.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method of providing navigation information in a peer-to-peer communication system, the method comprising steps of:

obtaining a communication requirement for a first user wherein the communication requirement of the first user depends on a second user;

determining at least one proximal navigation route for the first user and the second user based on the communication requirement dependent upon network considerations along the route; and providing the at least one proximal navigation route to the first user and the second user based on the communication requirement, wherein the first user and the second user form the peer-to-peer communication system.

2. The method of claim 1, wherein the determining step comprises:

obtaining a first start location and a first destination location of the first user; and obtaining a second start location and a second destination location of the second user.

3. The method of claim 1, further comprising:

providing continuously the at least one proximal navigation route to the first user and the second user.

* * * * *